(12) United States Patent
Burwell et al.

(10) Patent No.: US 7,337,590 B2
(45) Date of Patent: Mar. 4, 2008

(54) TANK RETAINING SYSTEM

(75) Inventors: John Burwell, Eagan, MN (US);
Douglas Morrissette, Minneapolis, MN (US); Robin L. Berg, Sr., Hudson, WI (US); David Grams, Rosemount, MN (US)

(73) Assignee: Xerxes Corporation, Minneapolis, MN (US)

( * ) Notice: Subject to any disclaimer, the term of this patent is extended or adjusted under 35 U.S.C. 154(b) by 0 days.

(21) Appl. No.: 11/080,425

(22) Filed: Mar. 16, 2005

(65) Prior Publication Data
US 2005/0155192 A1 Jul. 21, 2005

Related U.S. Application Data

(63) Continuation of application No. 10/135,367, filed on May 1, 2002, now Pat. No. 7,028,967.

(51) Int. Cl.
*E04B 1/00* (2006.01)
(52) U.S. Cl. ...................... 52/741.1; 248/500
(58) Field of Classification Search ............... 248/304, 248/500, 70, 73, 74.3, 67.7, 74.1; 24/265 H, 24/265 CD, 69 CT, 69 WT, 71 TD, 68 CD, 24/68 BT, 68 D; 294/82.2, 82.33; 52/745.21, 52/741.1, 23
See application file for complete search history.

(56) References Cited

U.S. PATENT DOCUMENTS

| | | | |
|---|---|---|---|
| 3,894,707 A | 7/1975 | Heard | 248/230.9 |
| 5,317,788 A | 6/1994 | Esposito et al. | 24/300 |
| 5,383,259 A | 1/1995 | McIntire | 24/300 |
| 5,517,735 A | 5/1996 | Tsai | 24/599.9 |
| 5,638,584 A * | 6/1997 | De Anfrasio | 24/265 H |
| 5,655,265 A | 8/1997 | Schneider et al. | 24/21 |
| 6,032,916 A | 3/2000 | Holliday | 248/505 |
| 6,290,195 B1 | 9/2001 | Deuer | 248/230.8 |
| 6,308,383 B1 | 10/2001 | Schrader | 24/21 |
| D459,855 S * | 7/2002 | Fujikawa et al. | D34/35 |
| 6,467,344 B1 | 10/2002 | Ly et al. | |
| 6,786,689 B2 | 9/2004 | Dorris | |
| 7,028,967 B2 * | 4/2006 | Burwell et al. | 248/500 |

OTHER PUBLICATIONS

U.S. Appl. No. 11/507,046, filed Aug. 21, 2006, inventor Dorris.
U.S. Appl. No. 11/588,245, filed Oct. 27, 2006, inventor Dorris et al.

* cited by examiner

*Primary Examiner*—A. Joseph Wujciak, III
(74) *Attorney, Agent, or Firm*—Mueting Raasch & Gebhardt, P.A.

(57) ABSTRACT

A retaining system in which straps are provided with hooks that remain engaged with retaining loops even when tension on the straps is released and in which the tightening mechanism includes rods which are located partially below a rib surface on which the straps are placed such that the ends of the rods are near the plane of the strap ends, thereby greatly reducing the bending moment applied to the strap ends and threaded rods. The hook preferably includes a cavity opposite the hook end that will engage the retaining loop when no tension is on the line. In some embodiments, the hook includes a spring-loaded retaining clip to further ensure that the hook does not become disengaged from the retaining loop. The tightening mechanism includes two rods, each of which is positioned to one side of a rib on which the straps rest.

7 Claims, 8 Drawing Sheets

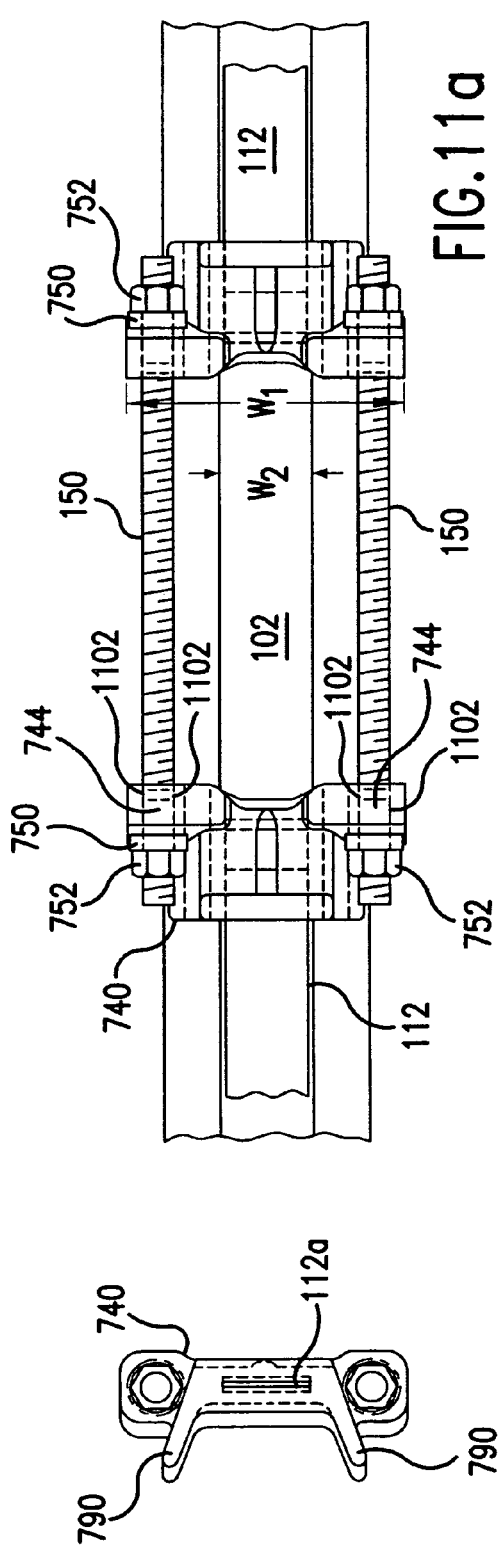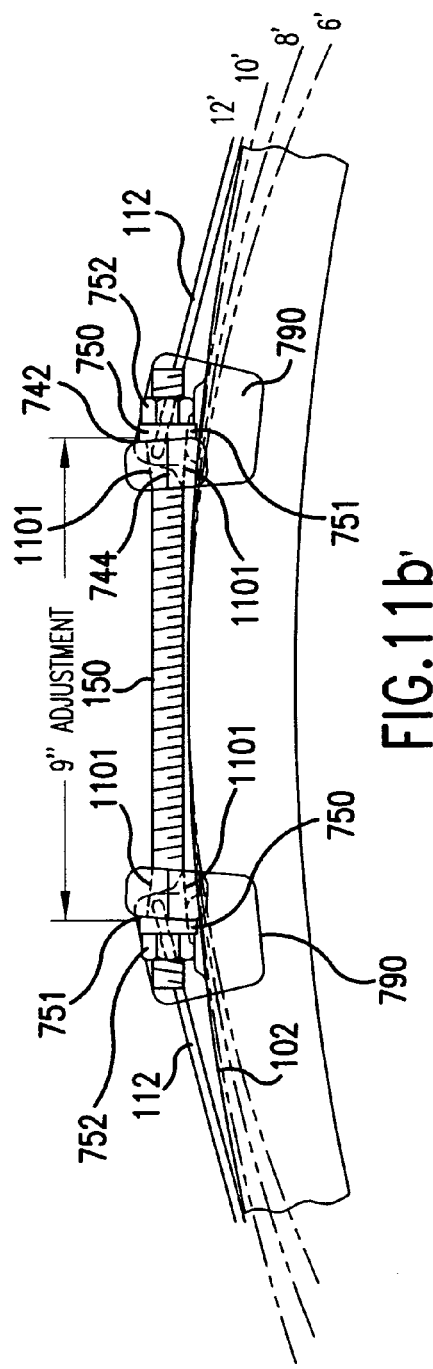

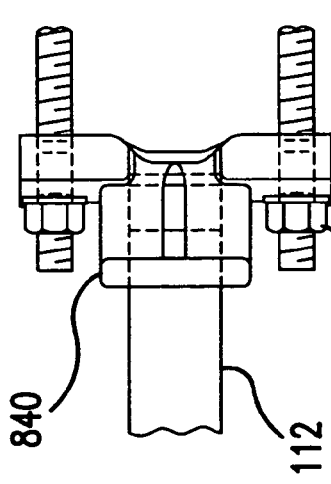
FIG.12b
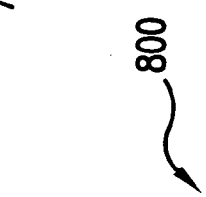
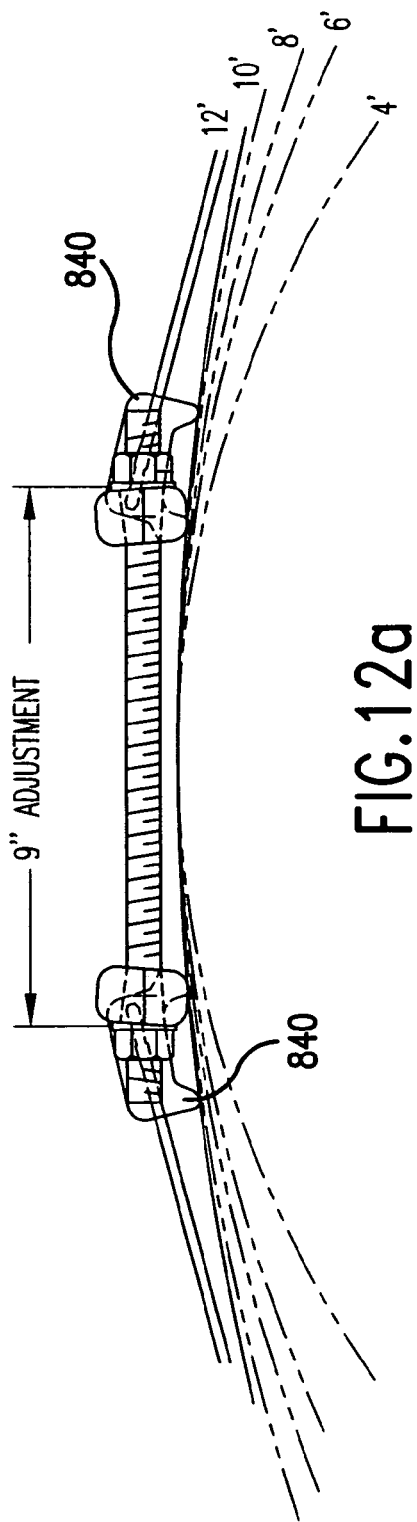
FIG.12a
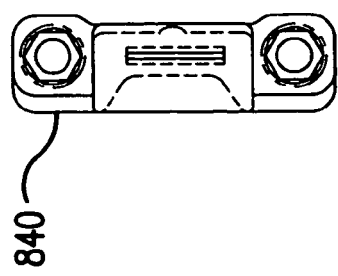
FIG.12c

TANK RETAINING SYSTEM

This application is a continuation of U.S. patent application Ser. No. 10/135,367, filed May 1, 2002, now U.S. Pat. No. 7,028,967.

BACKGROUND OF THE INVENTION

1. Field of the Invention

The invention relates to storage tanks generally, and more particularly to a retainer system for securing a tank to an anchor such as a deadman or a slab.

2. Discussion of the Background

Underground storage tanks are commonly used for the storage of liquids, including gasoline, other petroleum products, and wastewater. These tanks are generally cylindrical in shape, with either curved (e.g. hemispherical) or flat ends. Underground storage tanks may be made of many materials, including steel and fiber reinforced plastic (referred to herein as FRP and fiberglass). Such tanks may be single or multi-walled.

USTs are installed in a wide variety of locations and under a wide variety of conditions. In some locations, the water table is high enough such that some or all of the UST is below the water table. In these situations, a buoyant upward force will act on the tank. If the buoyant force exceeds the downward forces acting on the tank, the tank will 'float' up out of the ground (referred to herein as flotation). This situation is obviously undesirable.

One method commonly used to ensure that flotation does not occur is through the use of anchors such as slabs or deadmen. Slabs and deadmen are typically constructed of reinforced concrete. A slab is typically several inches thick and wider and longer than the corresponding tank. A deadman is typically 12 to 36 inches wide, 8 to 12 inches high, and usually has a length equal to or greater than the corresponding tank. Deadmen are typically installed on both sides of a tank. A detailed discussion of slabs and deadmen, and their use in anchoring underground storage tanks can be found in U.S. Pat. No. 6,467,344, entitled "Underground Storage Tank Buoyancy and Buoyancy Safety Factor Calculation Method and Apparatus," which is commonly owned by the assignee of the present application and which is hereby incorporated by reference herein.

Tanks are commonly attached to anchors such as slabs and deadmen using straps. The straps are commonly used in pairs, with each strap connected on one end to a hook that is engaged with a loop, or lug, on the anchor. In one embodiment, the other ends of the straps are connected to each other.

In the past, tightening mechanisms, such as turnbuckles, were typically located at both ends of the straps near the anchor lugs. This tightening mechanism could not be operated if located at a position where it was in contact with the tank. This arrangement requires installation personnel to enter the excavation pit in which the tanks were located in order to install and tighten the straps. This practice was potentially unsafe because it is possible for excavation sidewalls to collapse unless very expensive shoring was used. Additionally, if there was water in the hole, tightening was difficult.

The aforementioned problems with traditional strap systems led Xerxes Corporation ("Xerxes") to develop the "Man Out of the Hole" system approximately 15 years ago. In this system, a tightening mechanism was developed that could be located on top of the tank so that it could be operated by an installer standing on top of the tank, thereby doing away with the need for installation personnel to enter the excavation pit during installation. This system proved effective and has since been adopted by a large portion of the industry.

While the original Man Out of the Hole system has been a dramatic improvement and has generally proven effective, it is not optimal. First, the system requires installation personnel to maneuver the hook end of the strap onto the retaining loop on the anchoring system, and to maintain tension on the strap once hooked to avoid having the hook disengage from the anchor retaining loop. This operation requires patience, and time, especially on the part of inexperienced installation personnel. Second, the Man Out of the Hole system uses a threaded rod positioned above the tank so that the middle of the rod clears the tank. The rod is supported by a pair of brackets, each of which is attached to a strap. A bending force may be created by this elevated rod which means that the brackets need to be strengthened to support this force.

What is needed is an improved system that in which the strap hooks are more easily engaged with the retaining loops and a less expensive tightening mechanism that places less bending force on the brackets, is simple, and cost effective.

SUMMARY OF THE INVENTION

The present invention meets the aforementioned need to a great extent by providing a retaining system in which straps are provided with hooks that remain engaged with retaining loops even when tension on the straps is released and in which the tightening mechanism includes threaded rods which are located partially below the rib surface on which the straps are placed such that the end of the threaded rods or is in or near the same plane as the strap ends, thereby reducing the bending moment applied to the brackets. The hook preferably includes a cavity opposite the hook end that will engage the retaining loop when no tension is on the line. In some preferred embodiments, the hook further includes a spring-loaded retaining clip to further ensure that the hook does not become disengaged from the retaining loop. The tightening mechanism includes two rods, each of which is positioned to one side of a rib on which the straps rest.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIGS. 11(a), (b), and (c) are top, side, and end views, respectively, of a strap tensioning system according to an embodiment of the present invention.

FIGS. 12(a), (b), and (c) are side, top and end views, respectively of a strap tensioning system according to another embodiment of the present invention.

DETAILED DESCRIPTION OF THE PREFERRED EMBODIMENTS

The present invention will be discussed with reference to preferred embodiments of tank/anchor retainer systems. Specific details, such as specific materials and dimensions, are set forth in order to provide a thorough understanding of the present invention. The preferred embodiments discussed herein should not be understood to limit the invention.

Figure 1:
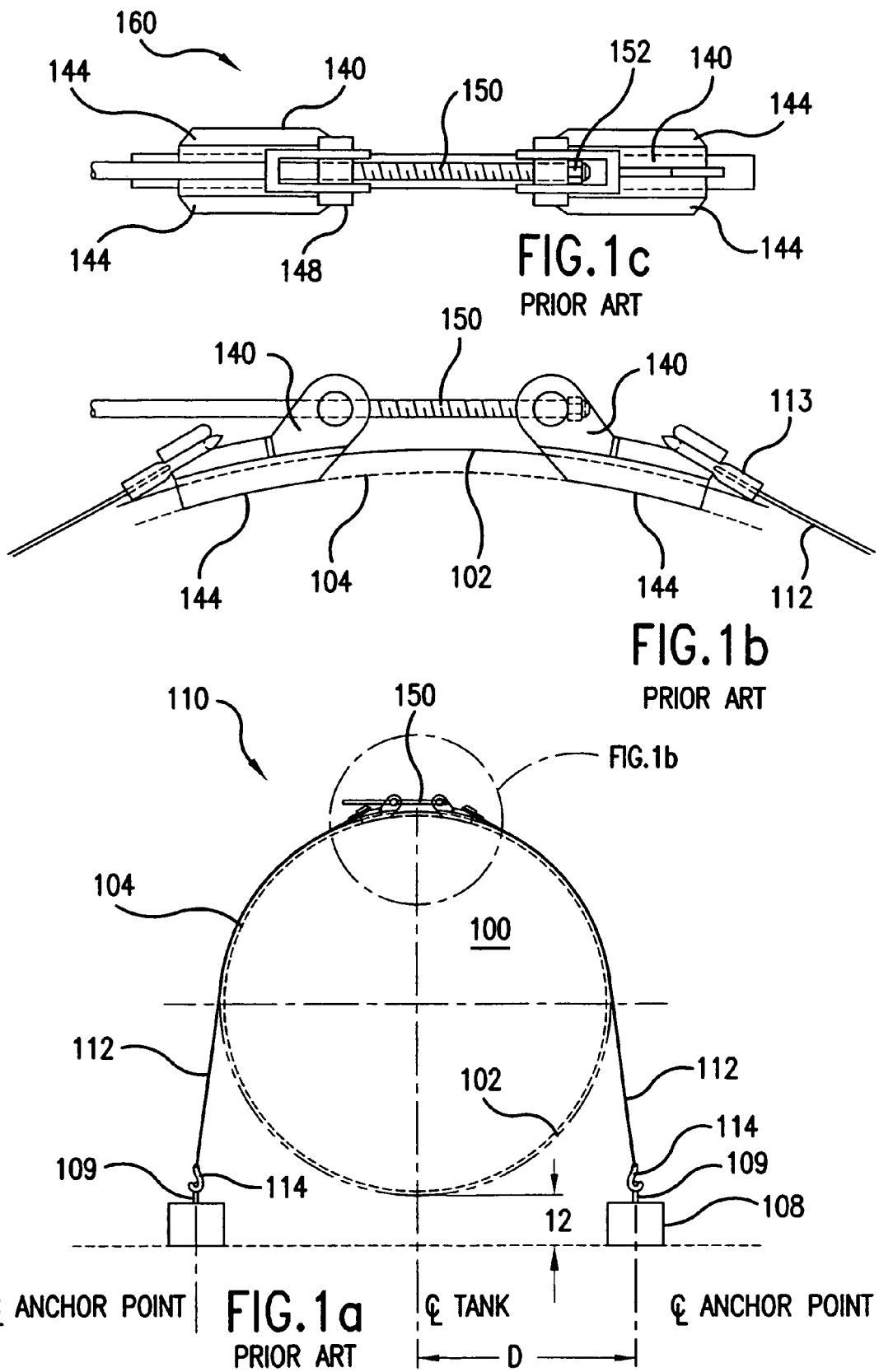
FIGS. 1a and 1b are side views showing a prior art tank/anchor retainer system.
FIG. 1c is a top view of the retaining system of FIGS. 1a and 1b.

Referring now to the drawings, wherein like reference numerals designate identical or corresponding parts throughout the several views, a side view of a tank 100 including a prior art Man-Out-Of-The-Hole retainer system 110 is shown in FIG. 1. The tank 100 is ribbed. The top surface of the ribs is indicated in phantom by line 102, while surface of the valleys between the ribs is indicated by line 104. The retainer system 110 includes a pair of fiberglass straps 112 with a hook 114 attached to one end of each of the straps. The hook 114 engages a retaining loop 109 provided on the respective deadman 108.

Figure 2:
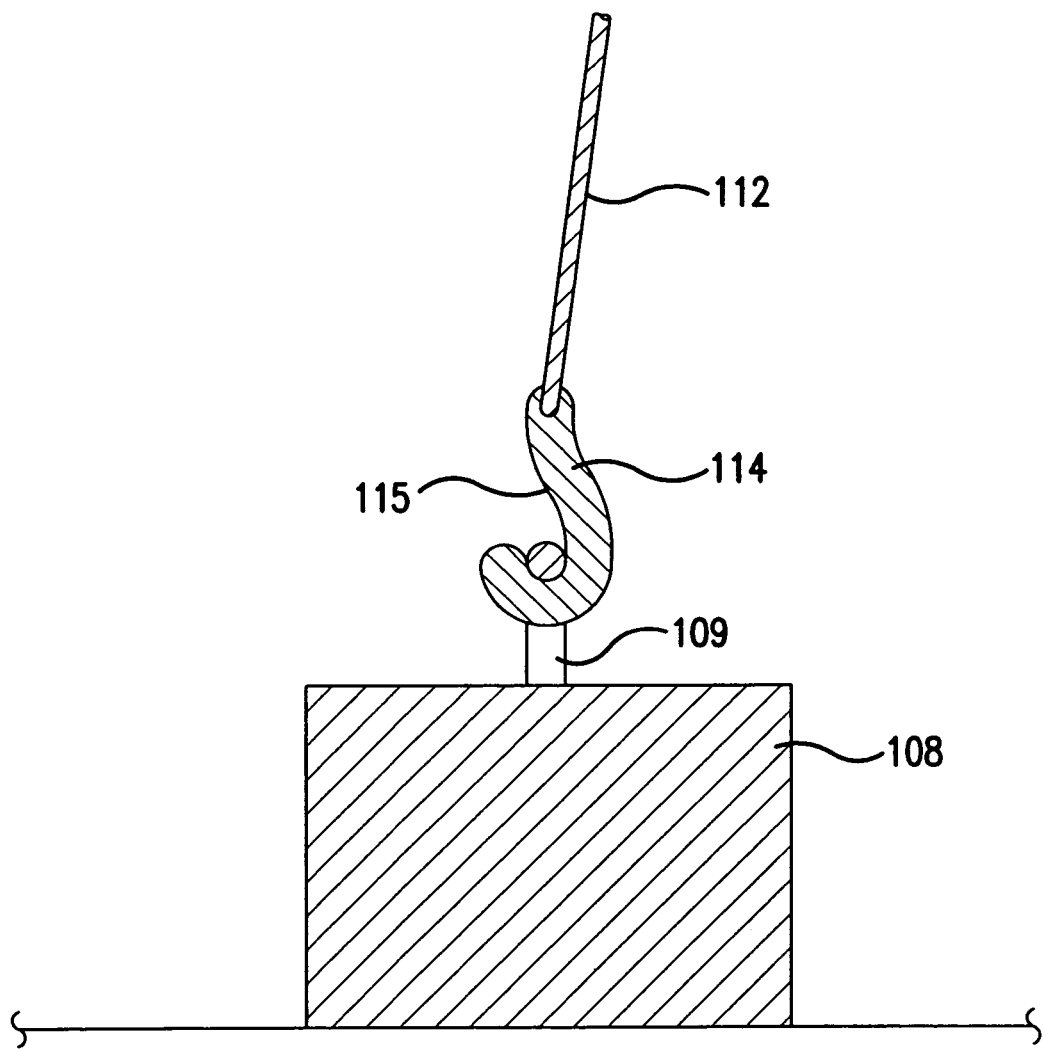
FIG. 2 is a partial cross sectional view of the retaining system of FIG. 1.

FIG. 2 is a cross sectional view showing the hook 114 engaged with the retaining loop 109 on the deadman 108. The engaging loop 109 is typically a ¾ inch round steel bar that forms a semicircular arch with each end of the arch embedded in the deadman 108. The hook 114 will remain engaged with the retaining loop 109 as long as tension is maintained on the strap 112. However, it is readily apparent that the hook 114 will be disengaged from the retaining loop 109 if tension on the strap 112 is released as the curved inner surface 115 of the hook 114 will not engage the retaining loop 109.

Referring now to FIGS. 1b and 1c, it can be seen that the end 113 of each strap 112 not attached to hooks 114 is attached to a bracket 140. The two brackets 140 along with the threaded rod 150 form a clamp 160. Each of the brackets 140 includes guides 144 that are adapted to straddle a rib on which the brackets 140 sit such that the brackets 144 remain on the rib. The threaded rod 150 includes a nut 152 on one end. The other end of the threaded rod 150 engages a threaded sleeve 148 such that when the nut 152 is turned, relative movement between the brackets 144 results. The location of the threaded rod 150 over the top surface 102 of the rib results in a bending moment being exerted on the brackets 140, which means that the brackets must be strengthened to carry this load, thereby increasing the cost of the brackets 140.

In practice, tank installers stand on the tank 100 and maneuver the straps 112 until the hooks 114 engage the retaining loops on the deadmen 108. Once this is accomplished, the installers must then line up the brackets 144 so that threaded rod 150 can be used to apply tension to the straps 112. It is during this operation that tension may be inadvertently released from the straps 112, thereby allowing hook 114 to be disengaged from retaining loop 109. When this occurs, the process must be restarted, which can be frustrating and is wasteful of time, particularly for inexperienced installation personnel.

Figure 3:
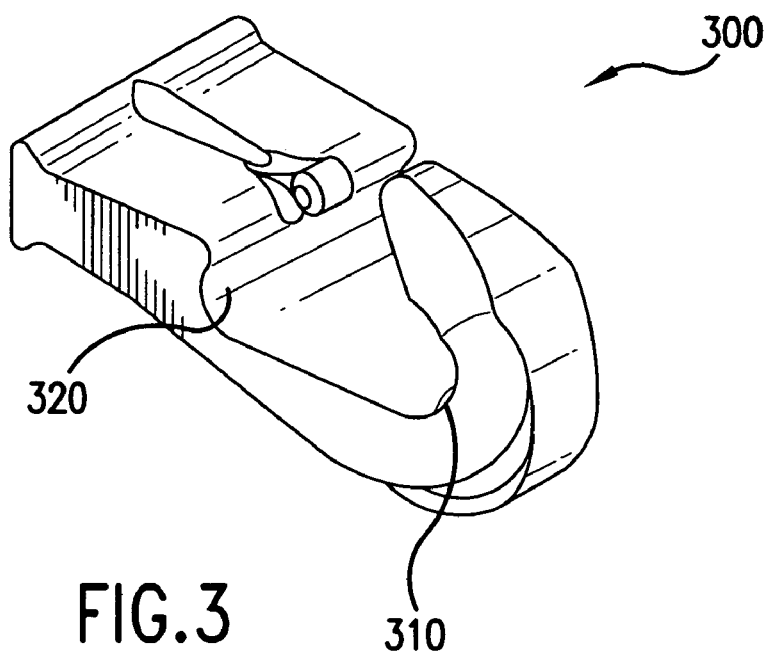
FIG. 3 is a perspective view of a hook according to an embodiment of the present invention.
Figure 4:
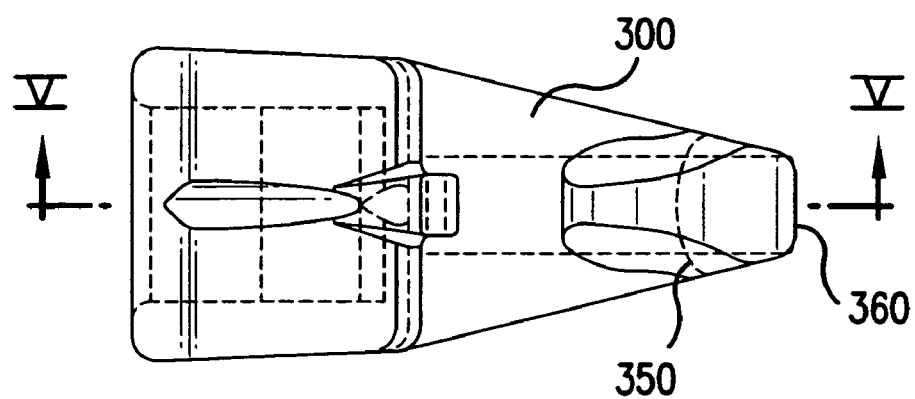
FIG. 4 is a top view of the hook of FIG. 3.

In contrast to the prior art, the current invention provides a retaining system including a hook 300 as shown in FIG. 3 (perspective view) and FIG. 4 (top view). The hook 300 includes a first end 310 and a second end 320. The first end 310 is the end that engages a deadman retaining loop when the hook 300 is connected to a strap under tension. The hook 300 also includes a curved cavity 320 that engages a deadman retaining loop when no tension is on the hook 300 as will be explained further below. Referring now to FIG. 4, it can be seen that the inner surface 350 (shown in phantom in FIG. 4) of first end 310 is curved. The curve is preferably matched to an expected curvature of a deadman loop with which the first end 310 is to be engaged when the hook 300 is under tension. The bottom surface 350 of first end 310 is substantially flat in a direction perpendicular to the curvature of the first end 310. This is done to help keep the hook 300 upright when it is not under tension and the outer surface 350 may be resting on a top surface of a deadman.

Figure 5:
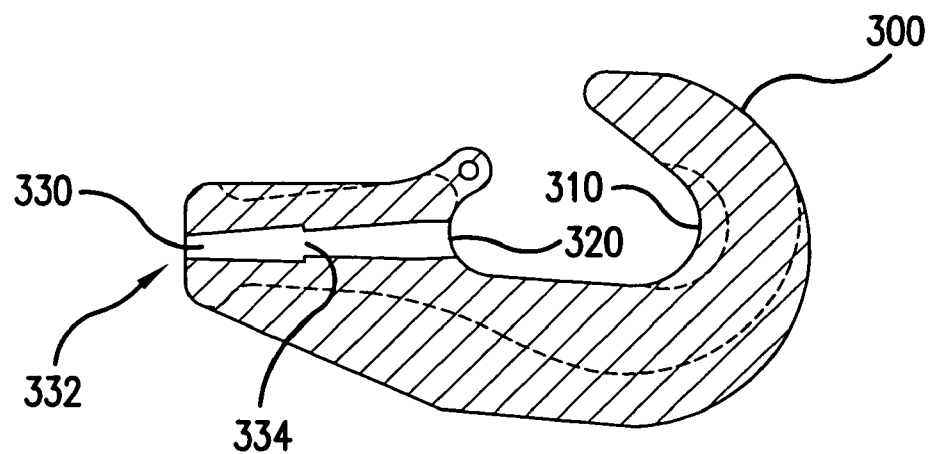
FIG. 5 is a cross-sectional view of the hook of FIG. 3 taken along the line V-V of FIG. 4.

A cross-sectional view of the hook 300 taken along the line V-V of FIG. 4 is illustrated in FIG. 5. The hook 300 includes a cavity 330 into which a strap (not shown in FIG. 5) can be inserted. The strap is preferably formed of fiberglass, but other materials may also be used. The cavity is preferably narrower near its entrance 332 as compared to other portions. When a fiberglass strap (not shown in FIG. 5) is inserted into the cavity 330 and an adhesive (which can also be fiberglass) is introduced into the cavity, the adhesive bonds with the fiberglass strap such that the combined thickness of the strap and adhesive is wider than the narrow entrance 332, thereby fastening the strap to the hook 300 mechanically. The cavity 330 also includes a narrowed neck 334, which functions in the same manner as the narrow entrance 332 to create a second mechanical bond to keep the strap attached to the hook 300.

Figure 6:
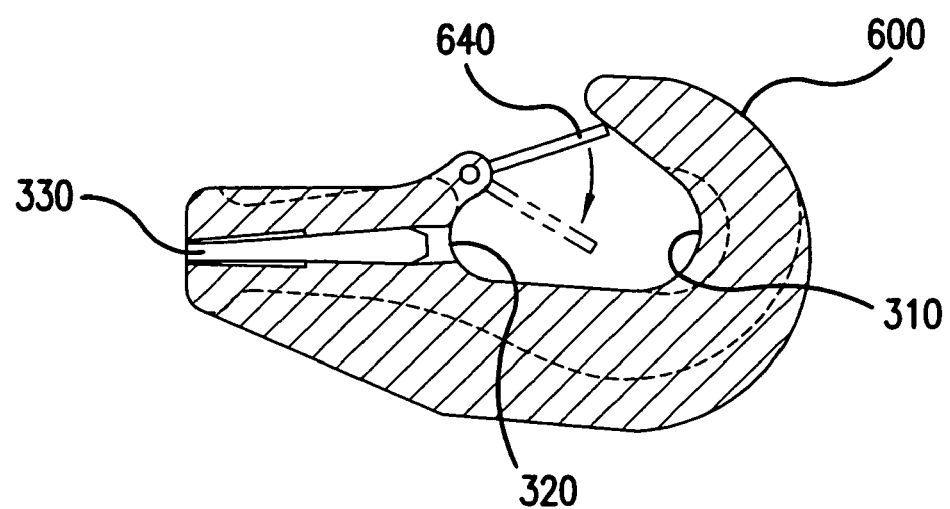
FIG. 6 is a cross-sectional view of a hook according to a second embodiment of the present invention.

A cross sectional view (similar to that of FIG. 5) of a hook 600 according to a second embodiment of the invention is illustrated in FIG. 6. The difference between the hook 600 and the hook 300 of FIGS. 3-5 is that the hook 600 includes a pivoting, spring-loaded arm 640. The arm 640 is pivotable as indicated by the phantom lines in FIG. 6. When in the open position (indicated by the phantom lines), the arm 640 allows the hook 600 to engage a deadman retaining loop (not shown in FIG. 6). When in the closed position, the arm 640 ensures that the hook 600 will not become disengaged with a deadman retaining loop when the hook 600 is not under tension. It is preferable for the spring of the spring loaded arm 640 to have a low spring constant such that the arm 640 will open when installation personnel attempt to engage the deadman loop with the hook 640 by swinging the hook 600 from an attached strap in a pendulum-like manner.

Figure 7:
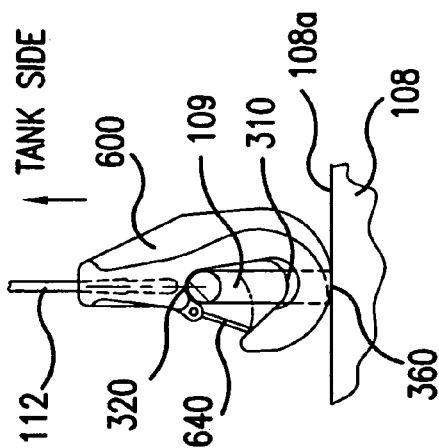
FIG. 7 is a side view of the hook of FIG. 6 engaging a deadman loop prior to tensioning.
Figure 8:
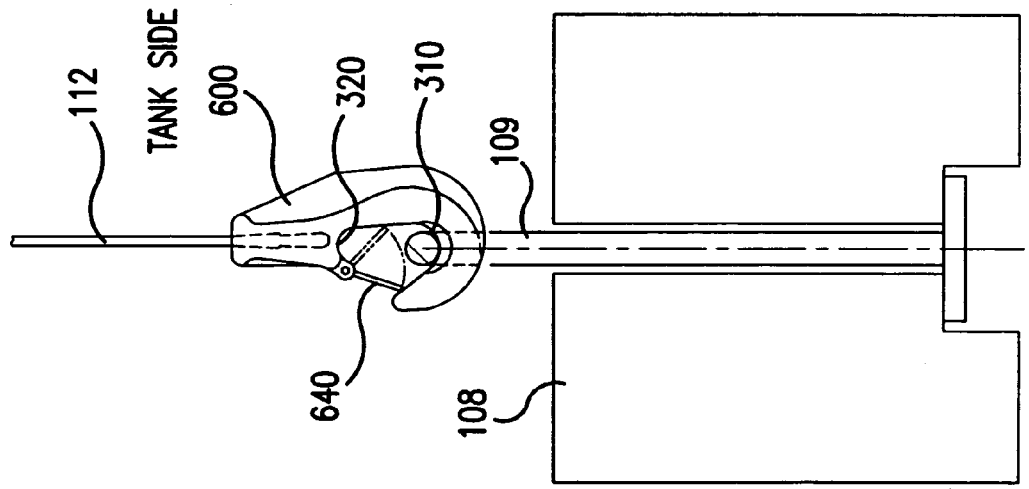
FIG. 8 is a side view of the hook of FIG. 6 engaging a deadman loop under tension.
Figure 9:
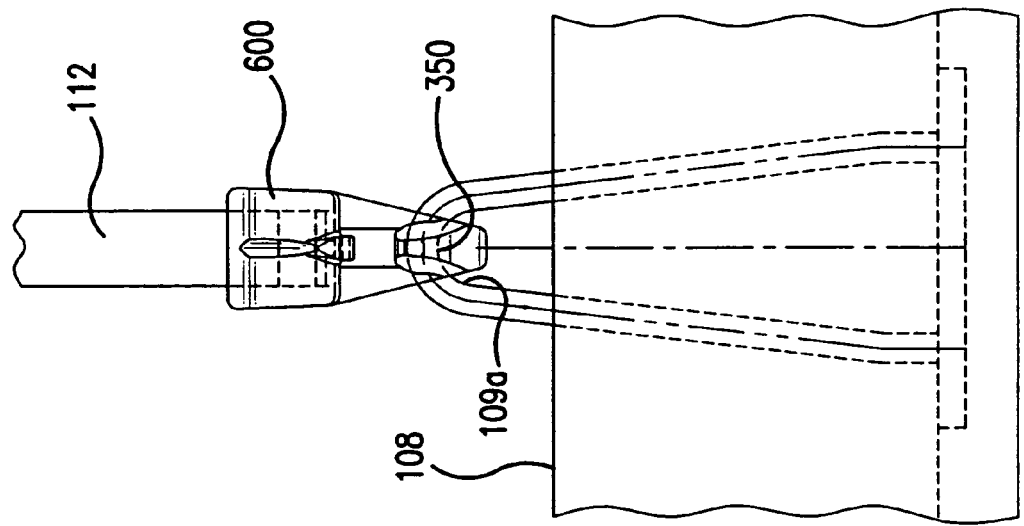
FIG. 9 is a front view of the hook of FIG. 6 engaging a deadman loop under tension.

FIG. 7 illustrates the hook 600 engaged with a deadman loop 109. There is no tension on the strap 112, so the cavity 320 engages the deadman loop 109. The arm 640 ensures that the hook 600 does not become free from the deadman loop 109. The bottom surface 360 of the first end 310 of the hook 600 maintains the hook 600 in an upright position. FIGS. 8 and 9 illustrate the hook 600 under tension. The radius of the curved inner surface 350 of the hook 600 conforms to the radius inner surface 109a of the deadman loop 109.

It should be noted that the height of the deadman loop 109 above the top surface 108a of the deadman 108 may vary. However, even if the bottom surface 360 of the hook 600 is not in contact with the top surface 108a of the deadman 108, the curved inner surface 350 of the hook 600 will help to maintain the hook 600 in an upright position.

Figure 10:
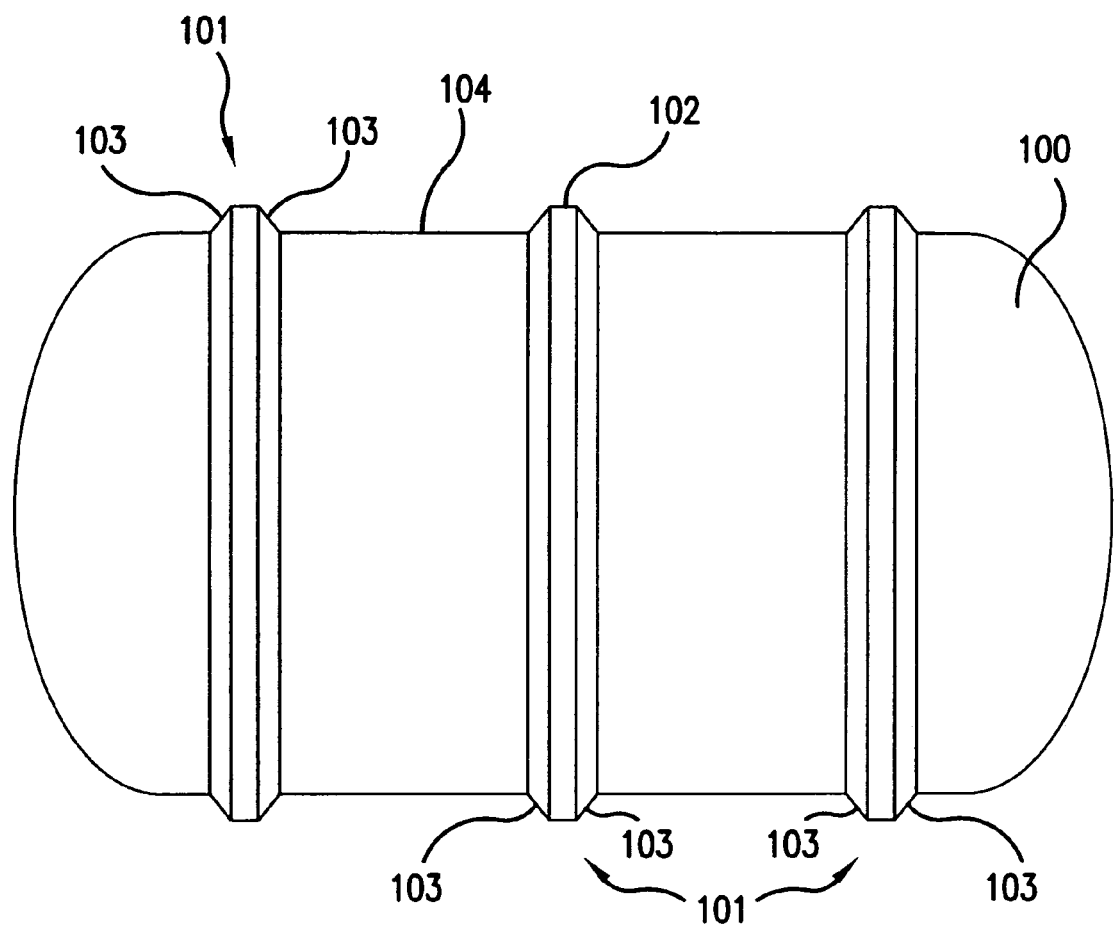
FIG. 10 is a side view of a typical ribbed underground storage tank.

A tensioning mechanism according to an embodiment of the present invention will now be discussed with reference to FIGS. 10 and 11. FIG. 10 is a side view of a typical cylindrical storage tank 100 including a plurality of ribs 101. Each rib includes a top surface 102 and two side surfaces 103. Referring now to FIGS. 11(a) and (b), a tensioning system 700 is shown in use on the tank 100. The tensioning system includes a bracket 740 attached to the ends of the two straps 112. Each bracket 740 includes two passages 744 through which pass a threaded rod 150. The width $W_1$ of the bracket is greater than the width $W_2$ of the top surface 102 of the rib 101. This allows the passages 744 to be arranged such that the threaded rods are positioned to the side of the top surface 102 rather than over the top surface 102 as in the system of FIG. 1. This allows the rods 150 to be positioned at least partially below the top surface 102 of the rib 101 in approximately the same plane as the strap 112, thereby greatly reducing the bending force exerted on the brackets 740 as compared to the prior art arrangement illustrated in FIGS. 1(a) and (b).

FIG. 1c illustrates an end view of the bracket 740. The bracket 740 includes two tabs 790 that straddle each side of a rib on tank 100. The tabs 790 are preferably flared to match the contour of the rib. The tabs 790 function to ensure that the bracket 740 does not slip off the top surface 102 of the rib. The bracket 740 also includes a cavity 112a that is sized to accept the strap 112. The cavity 112a is preferably positioned such that the strap 112 experience little or no bending when installed under tension on the tank.

Each of the passages 744 is flared in the vertical direction as indicated by phantom lines 1101 in FIG. 11(b) but is straight in the horizontal direction as indicated by phantom lines 1102 in FIG. 11(a). Additionally, the bracket 740 includes a curved surface 742, and a washer 750 has a complimentary curved surface 751. This allows the bracket 740 and the threaded rod 150 to pivot with respect to each other during tensioning (which is accomplished by tightening nuts 752).

FIGS. 12(a), (b), and (c) are side, top and end views, respectively, of another tensioning system 800 according to the invention that is suitable for use with a tank not having external ribs. The major difference between the tensioning system 800 and the system 700 of FIG. 11 is that the brackets 840 of the system 800 do not include the tabs 790 on the brackets 740 of the system 700.

It should be noted that it is possible to use various elements of the invention with prior art elements. For example, it is possible to use the hook 600 of FIG. 6 with the prior art tensioning mechanism of FIG. 11(b). Similarly, it is possible to use the prior art hook 114 (shown in FIG. 2) with the tensioning system 700 illustrated in FIG. 11. Other possible combinations readily apparent.

Obviously, numerous modifications and variations of the present invention are possible in light of the above teachings. It is therefore to be understood that within the scope of the appended claims, the invention may be practiced otherwise than as specifically described herein.

What is claimed is:

1. A method for securing an underground storage tank, the method comprising the step of:
    grasping a first end of a first strap, the strap having a second end with a first hook attached thereto, the first hook having a hook body having a first hooked end for engaging a retaining loop when tension is on the strap, the hook body having a second hooked end opposite the first hooked end for engaging the retaining loop when there is no tension on the strap;
    swinging the second end of the strap such that the first hooked end engages a first retaining loop on a deadman;
    releasing tension on the first strap such that the second hooked end engages the first retaining loop;
    repeating the grasping and swinging steps with a second strap such that a second hook on the second strap engages a second deadman retaining loop;
    connecting the first end of the first strap to an end of the second strap opposite the second hook; and
    applying tension to the first and second straps to secure the underground storage tank$_1$,
    where the first hook further comprises an arm, the arm being pivotally attached to the hook body at a point opposite the first hooked end, the arm being sized and positioned such that the arm is prevented from pivoting in a manner that would result in a distal end of the arm passing the first end.

2. The method of claim 1, wherein the hook body includes a cavity for accepting the strap, the cavity having a narrow entrance and a first wider interior portion.

3. The method of claim 2, wherein the cavity further includes a narrow neck and a second wider interior portion.

4. The method of claim 1, wherein the strap comprises fiberglass.

5. The method of claim 1, wherein the first hooked end has an outside surface, the outside surface being substantially flat in a direction perpendicular to a curvature of the first end.

6. The method of claim 1, wherein the first hooked end has an inside surface, the inside surface being curved in a direction perpendicular to the curvature of the first hooked end.

7. The method of claim 1, wherein the cavity formed by the hook body is curved.

* * * * *